United States Patent
Rachabathuni et al.

(10) Patent No.: US 6,628,938 B1
(45) Date of Patent: Sep. 30, 2003

(54) WIRELESS SYSTEM, A METHOD OF SELECTING AN APPLICATION WHILE RECEIVING APPLICATION SPECIFIC MESSAGES AND USER LOCATION METHOD USING USER LOCATION AWARENESS

(75) Inventors: Sailesh Rachabathuni, Santa Clara, CA (US); Jonathan Griffiths, Fremont, CA (US); Paul John Rankin, Horly (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 385 days.

(21) Appl. No.: 09/639,715

(22) Filed: Aug. 14, 2000

(51) Int. Cl.⁷ ................................................ H04M 3/42
(52) U.S. Cl. ........................ 455/414; 455/412; 455/514; 455/517; 455/456
(58) Field of Search ................................ 455/456, 457, 455/414, 466, 558, 419, 514, 517, 412, 422, 418

(56) References Cited

U.S. PATENT DOCUMENTS

| | | | | |
|---|---|---|---|---|
| 5,086,394 A | * | 2/1992 | Shapira | 340/825.44 |
| 5,719,918 A | * | 2/1998 | Serbetciouglu et al. | 455/414 |
| 5,835,861 A | | 11/1998 | Whiteside | 455/466 |
| 6,115,611 A | | 9/2000 | Kimoto et al. | |
| 6,400,958 B1 | * | 6/2002 | Isomursu et al. | 455/466 |

FOREIGN PATENT DOCUMENTS

| | | | | |
|---|---|---|---|---|
| EP | 1067808 A1 | * | 1/2001 | H04Q/7/22 |
| GB | 2340336 A | | 2/2000 | |
| JP | 10013961 A | | 1/1998 | |
| WO | WO0101711 A | | 1/2001 | |

OTHER PUBLICATIONS

E. Kovacs et al, "Adaptive Mobile Access to Context–aware Services", IEEE 1999, pp. 190–201.*
D. Abowd, "Context–awareness in wearable and Ubiquitous Computing", Vitual Reality (1998) 3:200–211.*
Nakanishi et al, "Context Aware Messaging Service: A Dynamical Messaging Delivery Using LOcation Information and Schedule Information", Personal Technologies (2000) 4:221–224.*
"Uniform Web Presence Architecture for People, Places, and Things", Philippe Debaty et al, HP Technical Report HPL–2000–67, Jun. 2000, 13 pages.
"People, Places, Things: Web Presence for the Real World", Tim Kindberg et al., HP Technical Report HPL–2000–16, Feb., 2000, 18 pages.

* cited by examiner

Primary Examiner—Duc Nguyen (57) ABSTRACT

A method of selecting an application in a wireless device and a user location method are provided. In the method of selecting an application, specific messages are received from a wireless station. The application specific messages are specific to services provided via a wireless station transmitting the application specific messages. The application specific messages have an application specific identifier identifying a specific application and data corresponding to the specific application. It is determined whether an application is present in the wireless device that corresponds to the received application specific identifier. If it is determined that the corresponding application is absent in the wireless device, the correspondingly received data is ignored. In the user location method that is used in a wireless system, locations and user identities of users of wireless devices are registered. The wireless devices are capable of roaming through the wireless system when the wireless devices enter into coverage areas of wireless stations in the system. A user location awareness application uses the registered locations and user identities of the wireless devices.

10 Claims, 13 Drawing Sheets

|  | S.NO. | FIELD NAME | TYPE | EMPTY OK |
|---|---|---|---|---|
| 101 | 1 | RECORD NUMBER | NUMBER | NO |
| 102 | 2 | USER ID | NUMBER | NO |
| 103 | 3 | LOCATION ID | NUMBER | NO |
| 104 | 4 | LAST ENCOUNTERED | DATE | NO |

FIG. 10

|  | LOCATION ID | DESCRIPTION | LATITUDE | LONGITUDE |
|---|---|---|---|---|
|  | A000 0140 | ... | ... | ... |
|  | A000 0141 | CACHE MOUNTAIN CABIN | N 65° 25.6' | W 147° 14.6' |
|  | A000 0142 | CARIBOU BLUFF CABIN | N 65° 28.3' | W 147° 34.3' |
| 111 | A000 0143 | COLORADO CREEK CABIN | N 65° 29.6' | W 147° 54.0' |
|  | A000 0144 | CROWBERRY CABIN | N 65° 19.3' | W 147° 27.6' |
|  | A000 0145 | LEE'S CABIN | N 65° 12.8' | W 147° 53.3' |
|  | A000 0146 | MOOSE CREEK CABIN | N 65° 13.7' | W 147° 37.8' |
|  | A000 0147 | RICHARD'S CABIN | N 65° 25.6' | W 146° 58.6' |
|  | A000 0148 | WICKERSHAM CREEK SHELTER | N 65° 16.7' | W 147° 50.8' |
|  | A000 0149 | WINDY GAP CABIN | N 65° 33.4' | W 147° 27.7' |
|  | A000 014A | ... | ... | ... |

WIRELESS SYSTEM, A METHOD OF SELECTING AN APPLICATION WHILE RECEIVING APPLICATION SPECIFIC MESSAGES AND USER LOCATION METHOD USING USER LOCATION AWARENESS

BACKGROUND OF THE INVENTION

1. Field of the Invention

The present invention relates to context aware wireless devices needing context dependent services. Such services may be location or user specific. Such wireless devices may be cell phones or PDAs (Personal Digital Assistants) with augmented functions, or dedicated devices, or any other suitable wireless device.

2. Description of the Related Art

Recent years have seen a great increase in subscribers world-wide to mobile telephone networks and, through advances in technology and the addition of functionalities, cellular telephones have become personal, trusted devices. A result of this is that a mobile information society is developing, with personalised and localised services becoming increasingly more important. Such "Context-Aware" (CA) mobile telephones are used with low power, short-range base stations in places like shopping malls to provide location-specific information. This information might include local maps, information on nearby shops and restaurants, information on exhibitions at museums and so on. The user's CA terminal may be equipped to filter the information received according to pre-stored user preferences or user profiles and the user is only alerted if an item of data of particular interest has been received.

As example of a CA terminal is given in a technical report published by Hewlett Packard, "Uniform Web Presence Architecture for People, Places, and Things", HPL-2000-67, 13 pages, June, 2000. This report-decribes HP's "Cooltown" vision. The Cooltown vision is that people, places, and things have web representation and that many useful services can be offered by creating a tighter link between the real word entity and its vitual representation. Software architectures are defined enabling the dynamic generation of Web contents based on the user context (location, identity, device capabilities), on his security permission, and on the relationships with other Web presences. In Cooltown, the future consists of nomadic people carrying personal communication and web browsing devices interacting with services that are location specific and customized to the user.

In Cooltown, a patron might enter into an art museum carrying a handheld personal communication device with an embedded web browser. The museum has web pages corresponding to each room of the museum that comes available automatically upon entering the room. Individual paintings also have a web presence. By approaching a painting, the web page for that painting becomes available automatically. Other services such as printing, shopping, and choosing one's next activity can be made more relevant as well by connecting the services to the user's location context. The web presence of the patron could be automatically linked to the web presence of the devices (cell phone, handheld device, etcetera) the patron's husband is currently carrying. The patron's husband clicks on a link representing the patron and a corresponding application pops up at the patron's husband's device, the application establishing a web link to the current patron's web presence. A web presence is accessible by any kind of HTTP client including but not limited to a Web browser, HTML pages being accessible by a client using simple URLs that refer to a home page at a server. At a given location, URLs become available from wireless "beacons". These beacons are small infrared or radio transceivers located at a particular location.

Thus in the future mobile information society many context, location and application specific services should be made available to a person carrying a handheld device such as a cell phone, a PDA or any other handheld device that is capable of communicating within a defined coverage area within a system.

SUMMARY OF THE INVENTION

It is an object of the invention to provide a method of selecting an application, for use in a wireless device, on the basis of application specific messages received from a wireless station.

It is another object of the invention to provide such a method wherein availability and/or desirability to run an application is checked.

It is still another object of the invention to provide such a method wherein application specific data in said application specific messages is passed to a selected application.

It is an object of the invention to also provide a wireless system running a user location awareness application using. location registration information of context aware wireless devices when such devices roam through a wireless system of wireless stations of limited range.

It is another object of the invention to provide such a wireless system while using historical registration data.

It is still another object of the invention to provide such a wireless system while using proximity information of users to users and/or of users to locations.

It is still another object of the invention to provide such a wireless system while filtering location registration information.

In accordance with the invention, a method of selecting an application is provided, said method comprising:

receiving application specific messages from a wireless station, said application specific messages being specific to services provided via a wireless station transmitting said application specific messages, and said application specific messages comprising an application specific identifier identifying a specific application and data corresponding to said specific application;

determining whether an application is present in said wireless device that corresponds to said received application specific identifier; and ignoring said correspondingly received data if it is determined that said corresponding application is absent in said wireless device.

Advantageously, said application specific messages are received as connectionless transmitted packets. Herewith, there is no need for unnecessary procedures such as used for connection-oriented communications. Particularly, for context aware roaming wireless devices that may have a need to quickly change applications a transmission method is needed avoiding exchange of a lot of system control data. Upon reception, the packets are re-assembled to application specific messages.

Advantageously, it is checked whether an application corresponding to the received application specific messages is active. Herewith, unnecessary halting of other running applications, particularly of applications needing the user interface of the wireless device, is avoided.

By first checking whether the specific application to be loaded matches a user profile of user preferences in the context wireless environment, it is prevented that currently not needed applications are made active.

In accordance with the invention, also a user location method for use in a wireless system is provided, said method comprising:

registering of locations and user identities of users of wireless devices that capable of roaming through said wireless system when said wireless devices enter into coverage areas of wireless stations in said system; and running a user location awareness application, said user location awareness application using said registered locations and user identities of said wireless devices.

Herewith users in the system are made aware of each other or of their location while moving from one location to the other, thereby providing a mechanism to relate services to users, such as location dependent services to a single user, to location dependent services to multiple users at a single location or at different locations. Such a mechanism is particularly useful in future wireless systems requiring context dependent services.

Particularly useful is an application using historical registration data so that a user's movement and behavior can be predicted in advance of providing services. Such movement could be heading into a direction of a particular wireless station, that could be a short-range beacon at a shopping mall or museum, or the like, or could have resulted that the particular wireless device and thus it's user actually is in proximity of the particular wireless station.

Another particularly useful application is determining proximity of a user or users to wireless stations. Herewith users can be made aware of the location, and users can be made aware of each others locations. Such a mechanism is particularly useful for roaming users who want to contact or meet each other. A user may advantageously also set a user profile to filter whether an alert should be provided in a given context. Also advantageously system behavior may be modified depending on proximity information. Users within range of the same beacon could have their user profiles checked so that users of similar interest could easily contact each other, for instance. Or users could check profiles provided by beacons. The system should be modified in that profiles of users entering and leaving a beacon's area should be added or removed from a beacon's set of profiles.

Another useful application is filtering of registration data, either at the side of the client, i.e., the wireless device, or at the side of the server. Such filtering could be necessary if a user passes beacons, particularly short-range beacons, too fast or too frequently, or to avoid system overhead through processing of redundant data.

BRIEF DESCRIPTION OF THE DRAWING

Throughout the figures the same reference numerals are used for the same features.

DESCRIPTION OF THE DETAILED EMBODIMENTS

Figure 1:
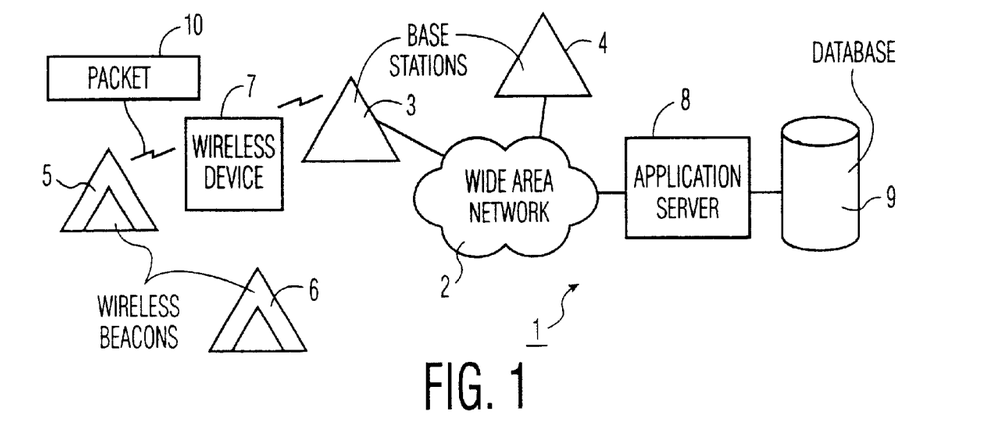
FIG. 1 schematically shows a wireless system according to the invention.

FIG. 1 schematically shows a wireless system 1 according to the invention. The wireless system 1 comprises a wide area network 2 with wireless stations 3 and 4, radio base stations of a cellular telephony network. The wireless system 1 further comprises wireless stations 5 and 6, short-range communication or broadcast beacons using radio communication or infrared communication or any other suitable wireless communication or broadcast, and a wireless device 7. The wide area network 2 is coupled to an application server 8 that uses a database 9. The wireless device 7 may be a cell phone that uses a cellular network communication protocol and that is further capable of communicating with the wireless beacons 5 and 6 using another communication protocol. The wireless device may also be a dedicated device only capable of communicating with the beacons 5 and 6. The wireless device may also be a dedicated device only capable of communicating through the base stations 3 and 4 with the wide area network 2. Preferably, the wireless device 7 communicates with the beacons 5 and 6 through packet transmission using a packet 10. The packet 10 conveys small quantities of information at a time. Packet transmission may use a protocol as described in a patent application filed earlier by the same assignee (PHGB000084 (UK Appln No. 0015454.2, Filed Jun. 26, 2000), the contents of which is herewith incorporated by reference. In the packet transmission protocol described therein added data to an existing protocol, the so-called Bluetooth protocol, are piggy backed on inquiry facilitation signals, as sixty four bit payloads. In this protocol, in a full inquiry cycle over sixteen hopping frequencies and a number of repetitions, and through inclusion of clock information of the beacon for synchronization purposes, a full beacon signal of sixteen kBytes can be transmitted. Other suitable packet transmission systems, may be applied as well. In principle, also connection-oriented communication could be used. The database 9 may store user location information and user identities, applications to be downloaded, or other information used by the invention as will be described in further detail hereafter. The application server 8 may be configured to download applications to the wireless device 7.

Figure 2:
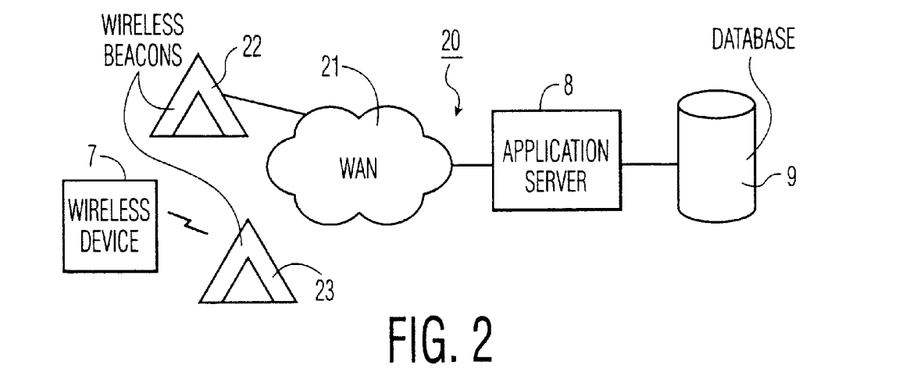
FIG. 2 schematically shows another wireless system according to the invention.

FIG. 2 schematically shows another wireless system 20 according to the invention. The wireless system 20 comprises a wide area network or local area network 21 of wireless beacons 22 and 23.

The wireless systems 1 and 2 may comprise further application servers and databases. Such further servers and databases may be located at and dedicated to the wireless beacons 5, 6, 22 and 23, or may be networked to form a dedicated network. In the wireless system 20, the wireless beacons 22 and 23 are networked to form a local area network to provide a tailored set of applications covering a given geographical area, the premises of a museum for instance. In an embodiment of dedicated servers and databases to wireless beacons, the respective servers and databases only serve areas covered by the respective wireless beacons.

Figure 3:
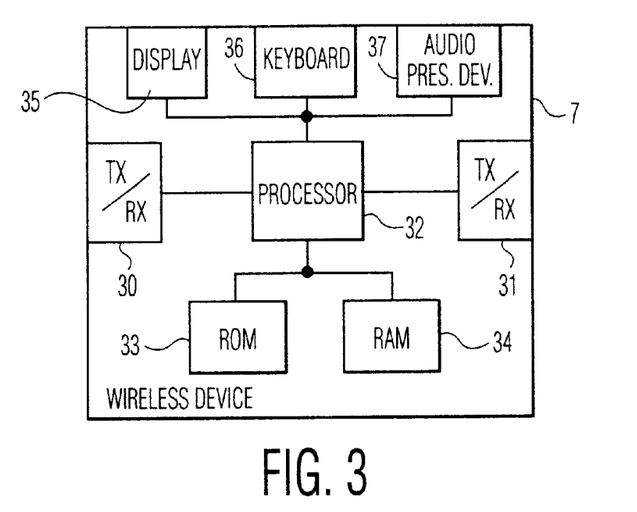
FIG. 3 shows a wireless device for use in a wireless system according to the invention.

FIG. 3 in more detail shows the wireless device 7. The wireless device 7 comprises transceivers 30 and 31 that are respectively configured to communicate with the radio base stations 3 and 4, and with the wireless beacons 5, 6, 22 and 23. The transceiver 30 is a cellular phone transceiver and includes well-known circuitry for transmission, modulation and demodulation, encoding and decoding, analog-to-digital conversion, and digital-to-analog conversion (not shown in detail here). The transceiver 31 is configured to operate in a Bluetooth environment, preferably with additional data transmission piggy backed on Bluetooth inquiry messages. The wireless device 7 further comprises a processor 32 that is coupled to a programmed ROM (Read Only Memory) 33 and a RAM (Random Access Memory) 34. The wireless device 7 further comprises a display 35, a keyboard 36, and an audio presentation device 37 that can present voice messages, alerts, or voice communication. The wireless device 7 may be programmed to run WAP applications (Wire Access Protocol) and then include a cell phone enabled browser.

Figure 4:
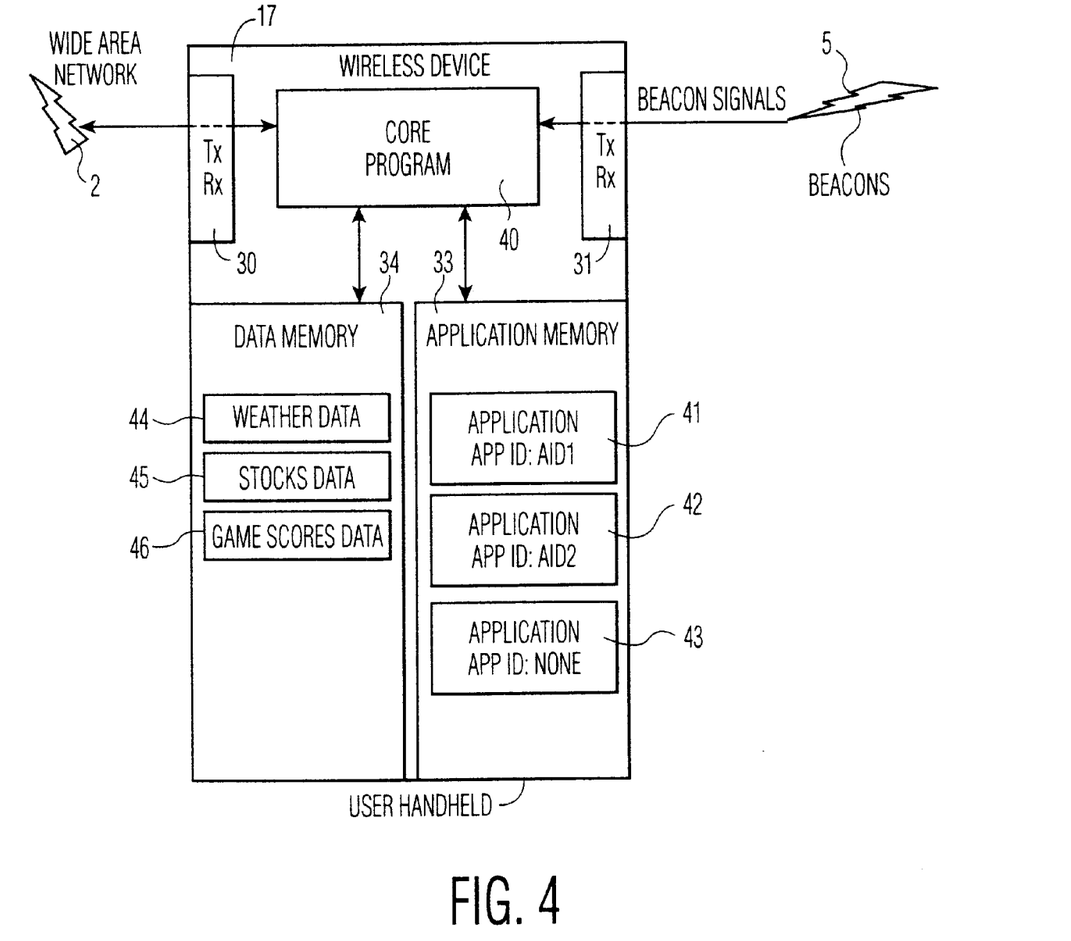
FIG. 4 is another representation of a wireless device according to the invention.

FIG. 4 is another representation of the wireless device 7 according to the invention to illustrate use of the wireless device 7 of receiving and processing application specific messages. The wireless device 7 comprises a core program 40 continuously running on the processor 32. Application memory 33 stores applications 41, 42 and 43. For application 41, an application specific identifier AID1 is also stored, and for application 42 an application specific identifier AID2. No identifier is stored for application 43. Data memory 34 may store data such as weather data 44, stock data 45, and game score data 46. The weather and stock data are received through generic beacon signals. The user of the wireless device 7 may decide that a new application should be loaded into the wireless device 7 and install or download such a new program, or that a stored program is no longer needed and delete such a program.

Figure 5:
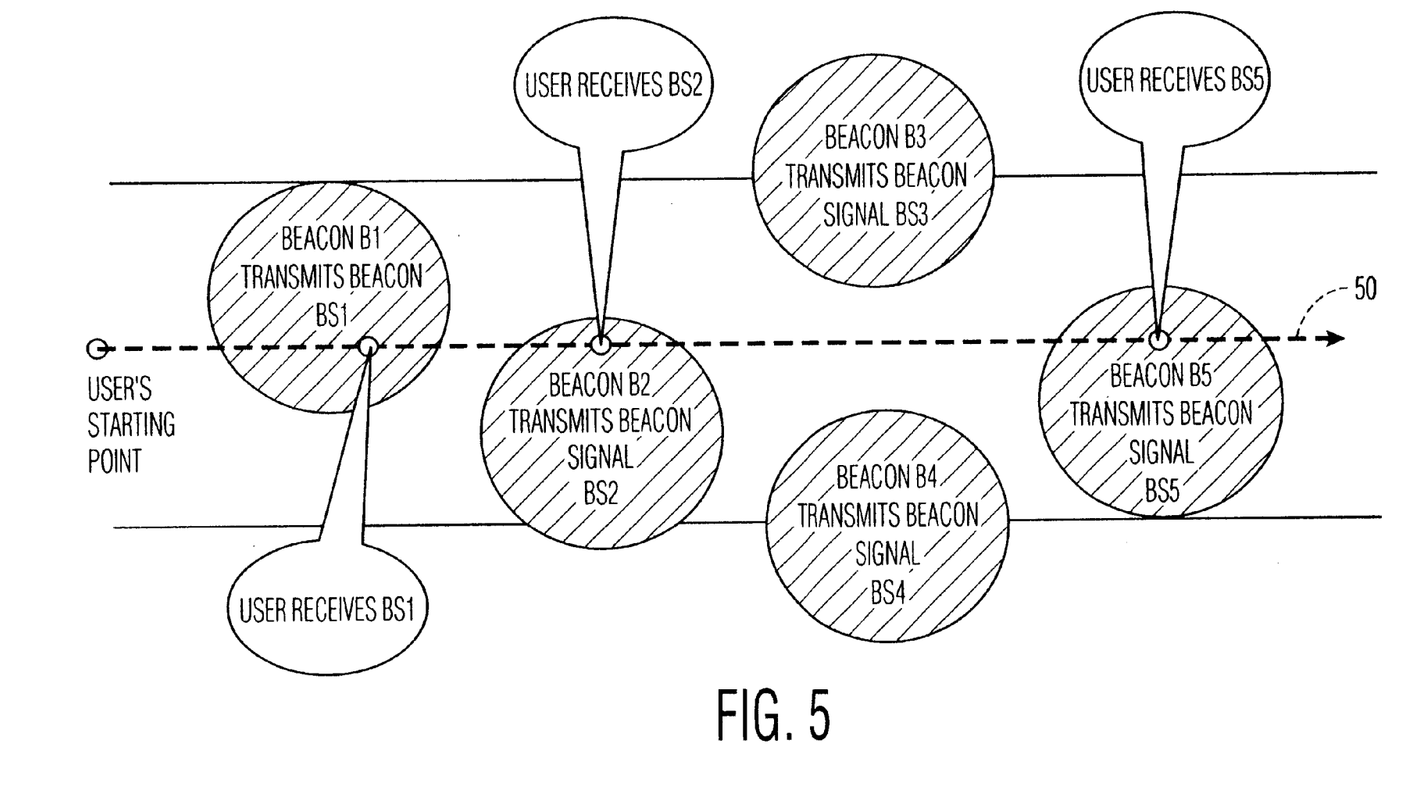
FIG. 5 illustrates roaming of a wireless device according to the invention.

FIG. 5 illustrates roaming of a user carrying the wireless device 7 according to the invention, indicated with a dashed arrow 50. While roaming the wireless device 7 enters into a range of a wireless beacon and leaves it to enter into a range of another wireless beacon, and so on. While roaming beacon respective signals BS1, BS2 and BS5 are received from respective wireless beacons B1, B2 and B5, the user entering transmission ranges of the beacons B1, B2 and B5. No beacon signals are received from beacons B3 and B4.

Figure 6A:
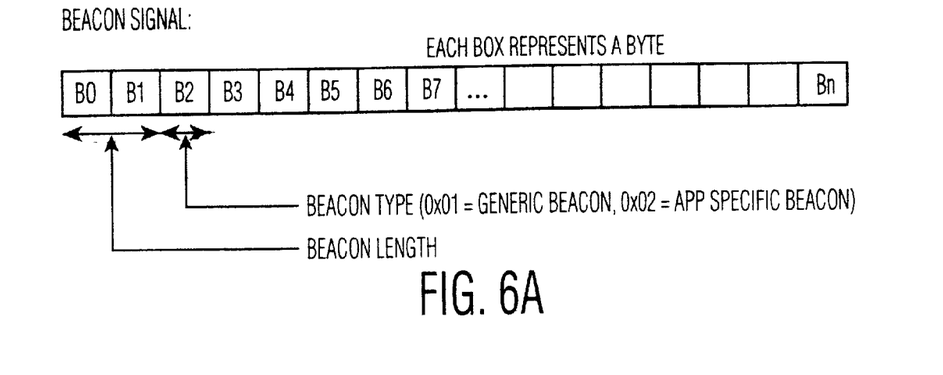
FIG. 6 shows beacon signals used in a wireless system according to the invention.
Figure 6B:
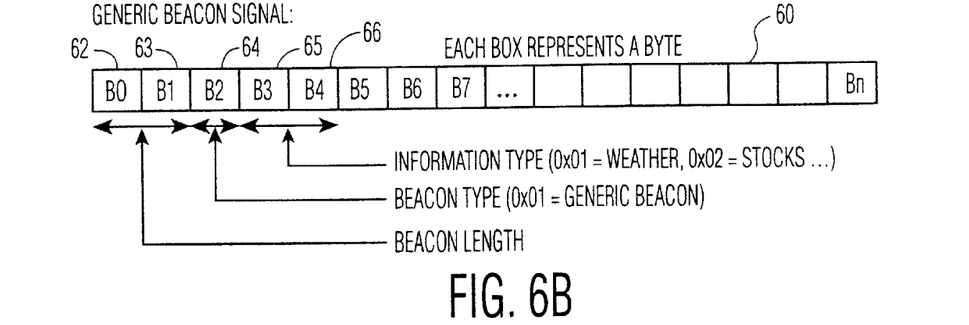
Figure 6C:
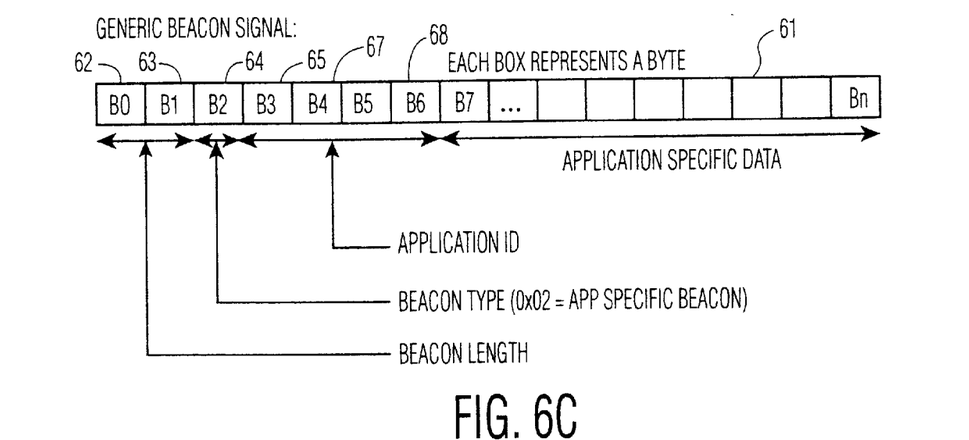

FIG. 6 shows beacon signals used in the wireless systems 1 and 20 according to the invention. The wireless beacons 5, 6, 22 and 23 each continuously broadcast beacon signals, such beacon signals including a generic beacon signal 60 as shown in FIG. 6B, and an application specific beacon signal 61 as shown in FIG. 6C. Bytes 62 and 63 are used to indicate the length of a beacon signal, and byte 64 to indicate the type of a beacon signal, generic or specific. For a generic beacon signal bytes 65 and 66 are used to indicate an information type of information contained in a beacon signal, such as weather data and stock data. For an application specific beacon, bytes 65–68 contain an application specific identifier, and the remaining bytes application specific data.

Figure 7:
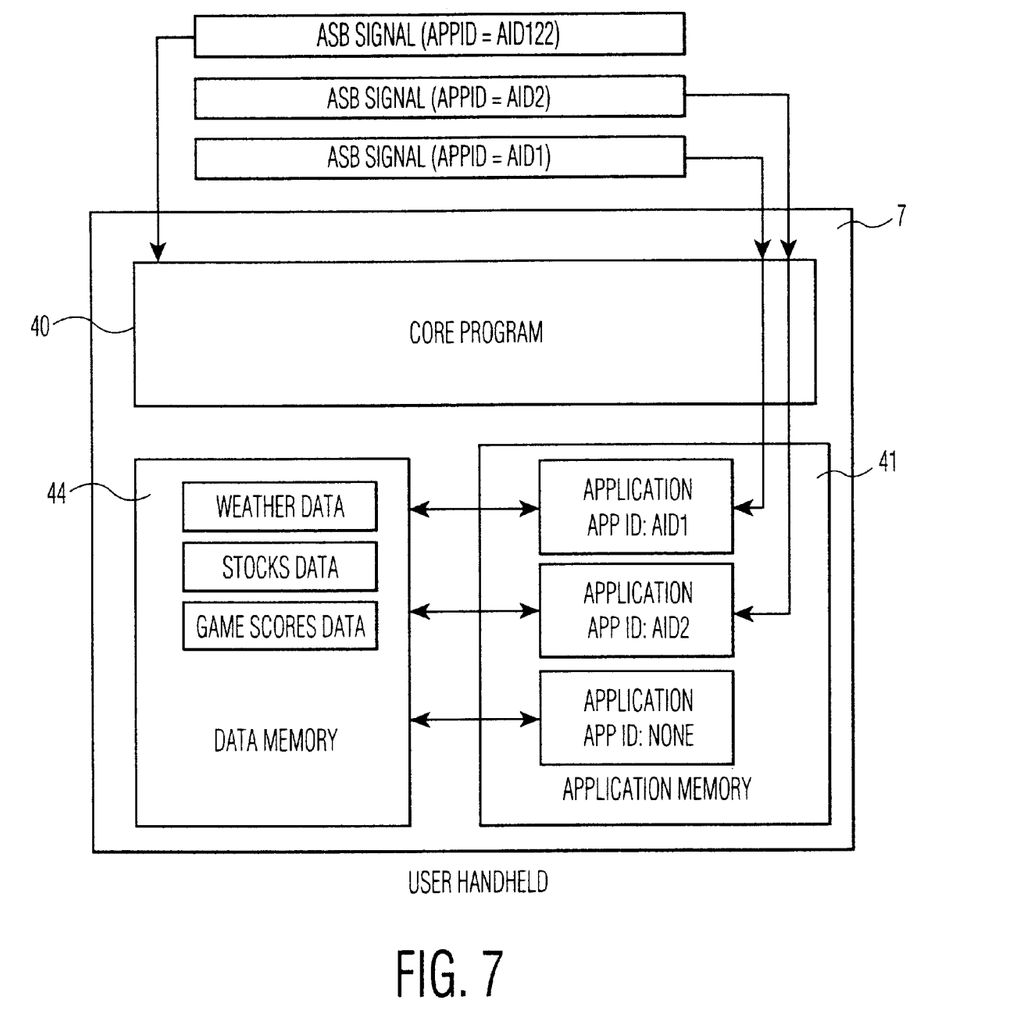
FIG. 7 is still another representation of a wireless device according to the invention.

FIG. 7 is still another representation of the wireless device 7 when receiving and processing application specific messages from wireless beacons. As shown, the wireless device 7 receives application specific messages with respective application specific identifiers AID1, AID2, and AID122, ignores the received application specific message with application specific identifier AID122, and processes the received application specific messages with application specific identifiers AID1 and AID2.

Figure 8:
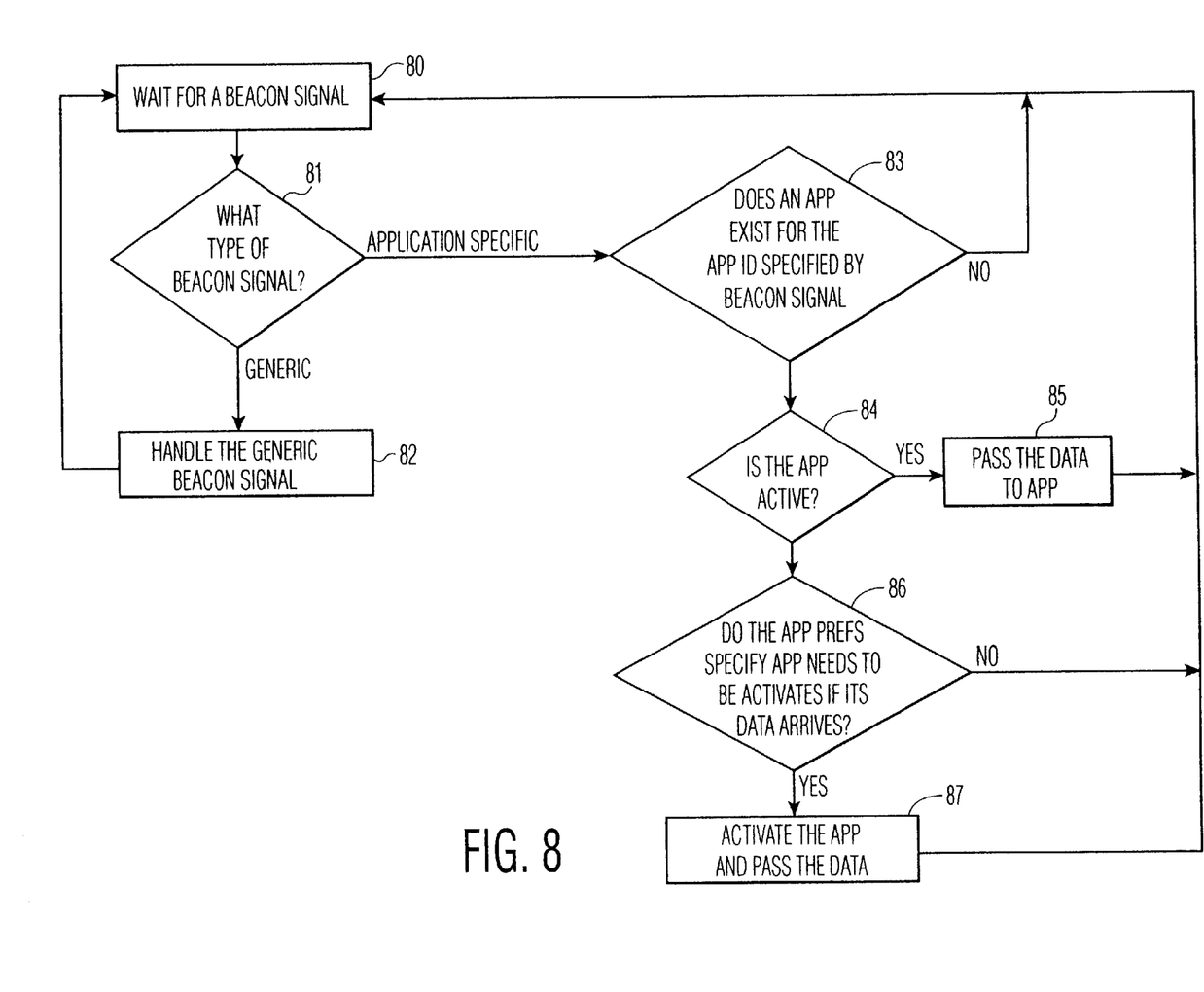
FIG. 8 is a flow chart illustrating operation of the invention.

FIG. 8 is a flow chart illustrating operation of receiving and processing of beacon signals. In block 80, the wireless device 7 waits for a beacon signal. In block 81, upon reception of a beacon signal, that is re-assembled from received packets, the wireless device checks a beacon signal's type. If a beacon signal is generic, in block 82, the wireless device 7 handles the generic beacon signal. If a beacon signal is application specific, in block 83, the wireless device 7 checks whether an application exists indicated by the received application specific identifier. If no such application exists, returned is to block 80. If such an application exists, in block 84 it is check whether the application is active. If the application is active, in block 85, correspondingly received data is passed to the active application or program. If the application is inactive, in block 86 a user profile of user preferences is checked for the desirability to activate the inactive application. If there is such a desirability, in block 87, the inactive application is activated and correspondingly received data is passed to the active application. The active program may respond to the passed data in various ways. It may bring the passed data to the users attention, it may check from other data stored in the wireless device 7 whether the passed data is of interest to the user, it may consult a central server through the WAN 2 to find out whether the passed data is of interest to the user, or it may send the passed data to the central server, possibly together with already stored data, for further processing.

Figure 9:
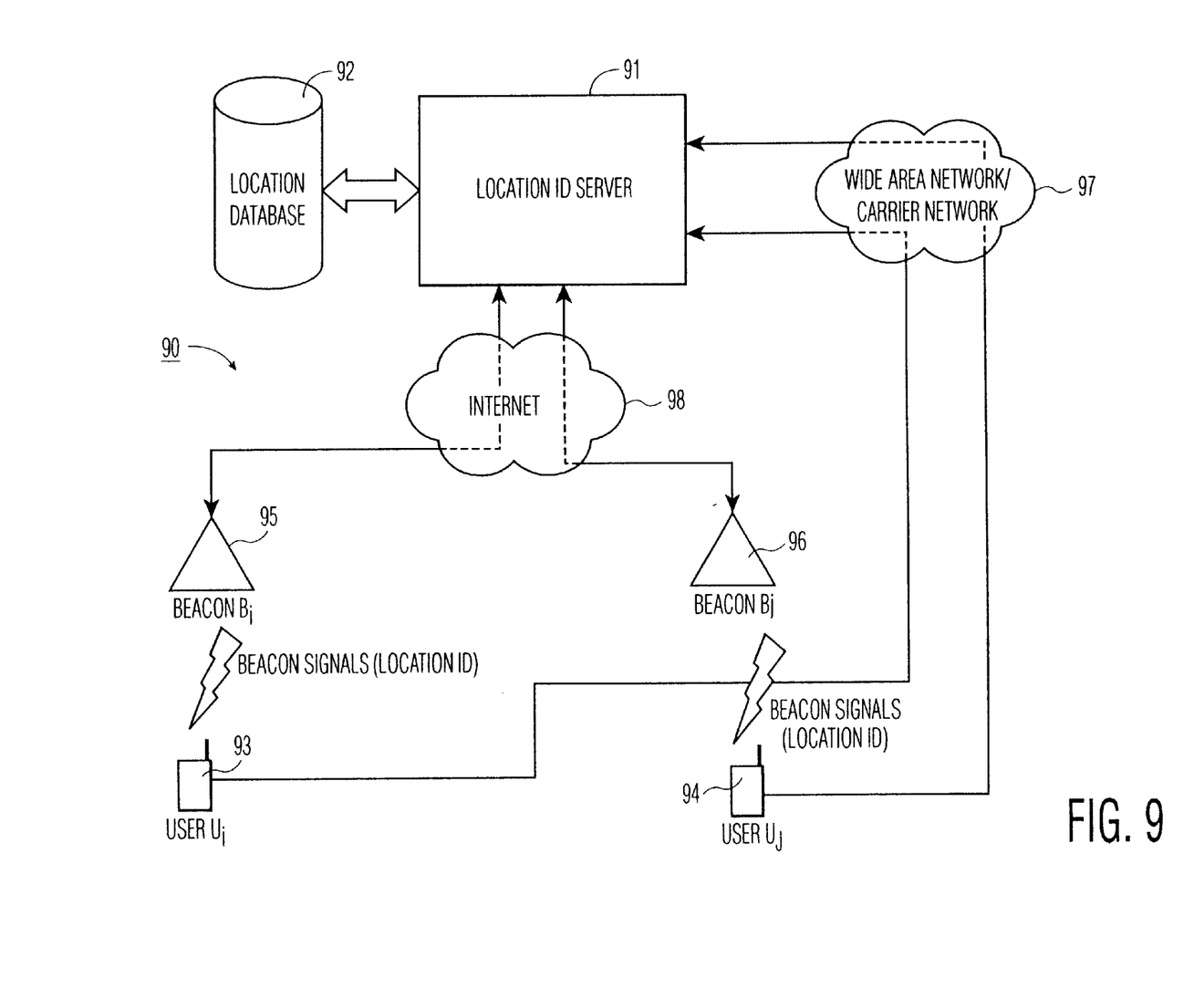
FIG. 9 schematically shows a wireless system with a location identification server according to the invention.

FIG. 9 schematically shows a wireless system 90. The wireless system 90 comprises a location identification server 91 that is coupled to a location database 92. The wireless system 90 further comprises wireless devices 93 and 94 of the type of the wireless device 7, and wireless beacons 95 and 96. The wireless devices 93 and 94 are configured to communicate with the location identification server 91 through wide area network or carrier network 97, that may be a cellular network. The wireless beacons 95 and 96 are configured to contact the location identification server 91 through the Internet 98. The location identification server 91 registers locations and user identities of users of wireless devices.

Figure 10:
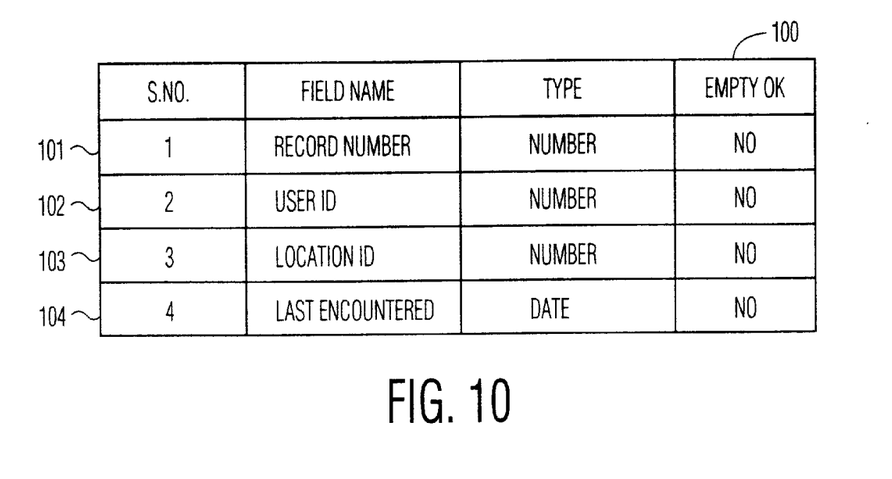
FIG. 10 shows a database record used by a location identification server according to the invention.

FIG. 10 shows a database record 100 used by the location identification server according to the invention. The record 100 comprises a record number field 101, a user identity or identification field 102, a location identification field 103, and a date and time field 104 registering when the user was last encountered at a given location such as at a location of a wireless beacon. The wireless system 90 may be configured to keep historical location data, to filter location data, and to delete location data. The wireless system 90 may be configured to use historical location data to predict movements of roaming users, to inform a user of it's proximity to a system resource, to make aware users of each other's proximity or to respective proximities to respective locations, or to other applications described or suggested by the present application. Services may be provided that use relative location information, describing the proximity of users and wireless devices to a known location or other users and wireless devices. The wireless system 90 may also be of a type as shown and described in FIGS. 1 and 2, in so far as location registration is meaningful. In it's simplest form, the wireless system 90 has the structure of a single network, such as a cellular network, that has the capability to coupled users to locations in terms of proximity to a system resource. Particularly, when such cellular networks are pico-networks, the described location awareness still is meaningful and useful. Preferably, the wireless system 90 at least also comprises short-range wireless beacons that have a better defined location. Typically, such short-range beacons have a transmission output power of 1 mW to 100 mW, limiting their transmission range.

In a system also containing wireless beacons, when roaming, the users encounter a succession of beacons, possibly encountering beacons more than once. The wireless device 7 then acts as a bridge or relay to pass beacon information to the location identification server 91. Upon reception of passed beacon information, the server 91 updates the location database 92 so that the database 92 reflects which wireless beacons wireless device have or had proximity to. The wireless system 90 may use short term or long term historical proximity data for a given wireless device or set of wireless devices to predict location or proximity changes. As an example, a user carrying a wireless device proceeds along a street into the range of wireless beacons. On the basis of gathered location information, the wireless system 90 may predict when the user arrives as a given location at a certain time. Such a prediction mechanism may be implemented as an application running at the server 91. The wireless system 90 may use long term history of proximity of location for users to build profiles of their movements, individual or shared interests. Herewith, users can be linked with places, shops, and other users. The database 92 could store a record of matches to these places and people which is averaged over time.

Figure 11:
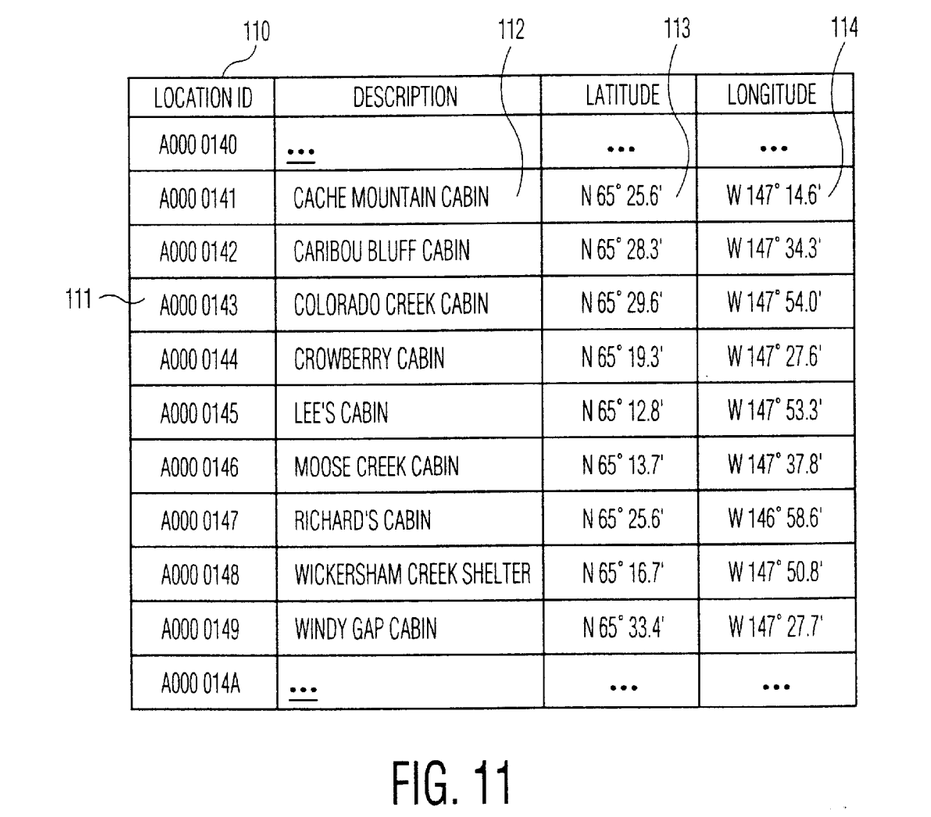
FIG. 11 illustrates acquisition of location identification information according to the invention.

FIG. 11 illustrates alternative acquisition of location identification information according to the invention. Shown is a table 110 with location identifiers 111 that uniquely identify a global location, with a description 112 of a location, and with latitude and longitude data of the location. Location identification can be represented in various ways, it can be a geographical description of a location whereby the location identifier itself forms the data to identify a location, it can be a reference to a geographical description of a location, i.e., just a pointer to other information that can be used to determine the location.

Figure 12:
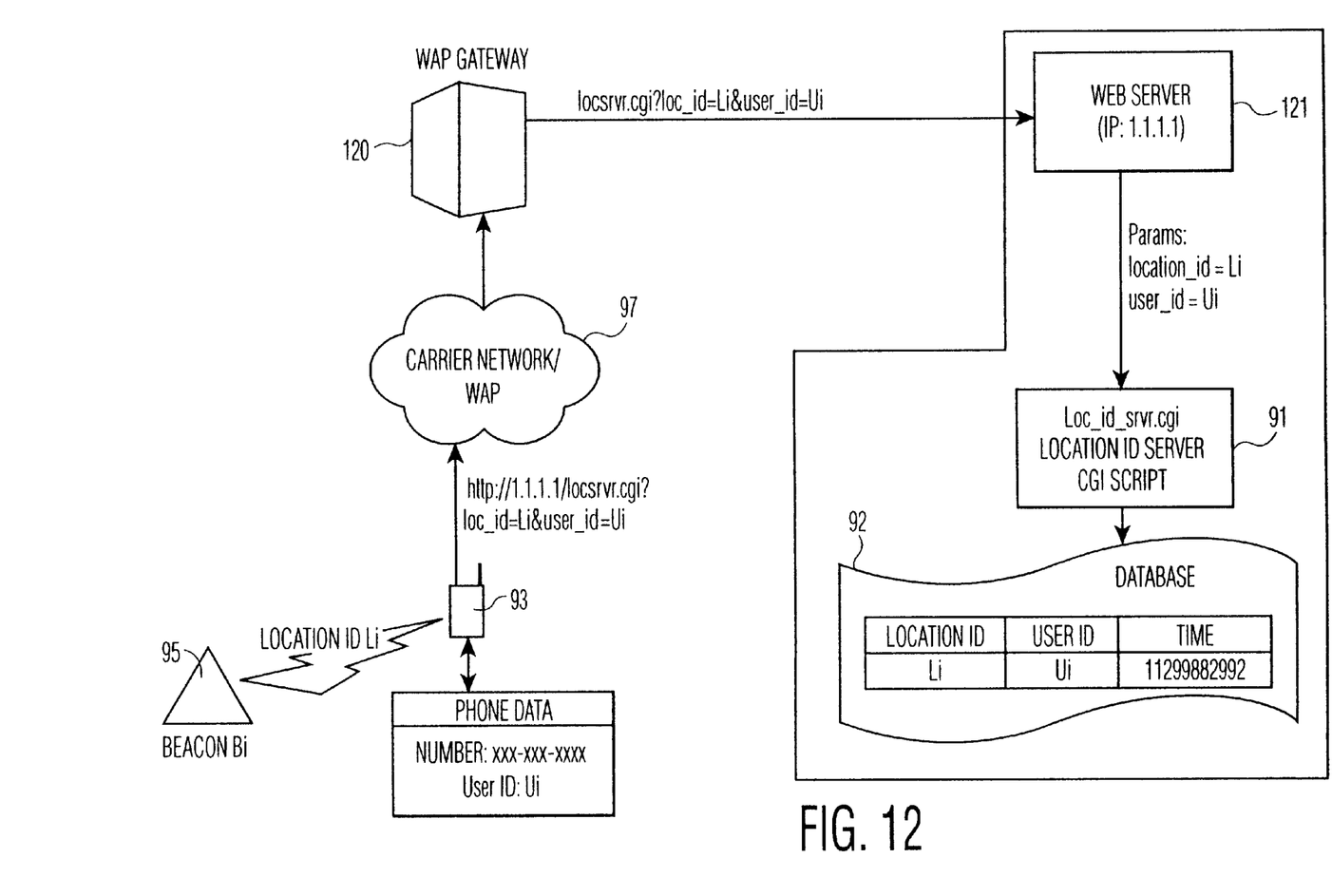
FIG. 12 shows a location identification server according to the invention.

FIG. 12 shows an embodiment of the location identification server 91 according to the invention. Through the cellular network 97, a WAP gateway 120 and an Internet server 121, the wireless device 93 passes location and user identity information to the location identification server 91 for inclusion into the database 92. The location identification server 91 is implemented as a CGI (Common Gateway Interface) script that resides on the web server 121 that can be reached through the Internet. The wireless device 93 transmits a location identifier it acquired from the wireless beacon 95 to the location identification server 91 using WAP: "http://1.1.1.1/locsrvr.cgi?loc_id=Li&user_id=Ui". The wireless device 93 calls the CGI script with the location identifier as a parameter, the location identification server's CGI script being invoked by the web server 121 it resides on. When being invoked, the location identification server's CGI script receives the location identifier as a parameter and the CGI script stores the location identifier in the database 92.

Figure 13:
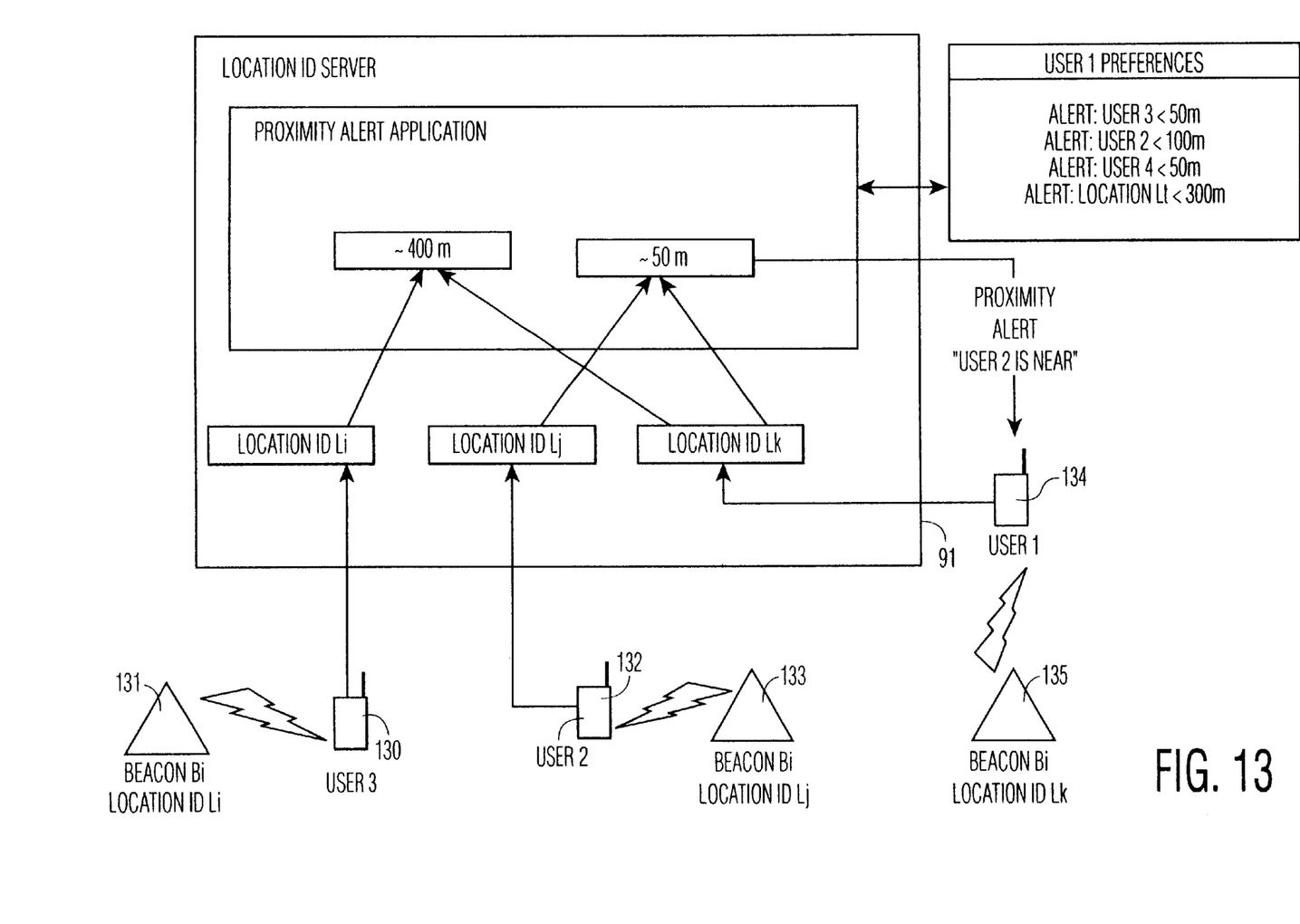
FIG. 13 illustrates a proximity alert application according to the invention.

FIG. 13 illustrates a proximity alert application according to the invention.

As shown, wireless device 130 is in-range of beacon 131 at location Li, wireless device 132 is in-range of beacon 133 at location Lj, and wireless device 134 is in-range of beacon 135 at location Lk. Further shown is a user profile 136 of user1 carrying wireless device 134. As a result of user2 matching user1's user profile 136, user1 will get a proximity alert "User2 is near".

The proximity alert application uses proximity information received and stored by the location identification server and processes that information to determine the proximity of any two users or one user and a location. The proximity alert application uses the following information to determine the proximity of two users or a user and a location:

Location of a User

This can be determined from the information that is stored by the location identification server 91. This application has to make some assumptions as to how long a user is considered to be near a location after the location identification is transmitted to the location identification server 91. For example, if the last known user location is obtained one hour ago, it is may not be right to assume that user is still at the same location.

Distance Between Two Given Location Identifications

Determining the distance between two locations represented by given location identifications depends on the implementation of the location identifications. If the location identification represents a geographical description of a location, the distance between two locations can be calculated directly from the location identifications. If the location identifications points to a stored description of geographical location, the stored location description must be retrieved to determine the distance between locations.

An application of being able to determine proximity of two users or a user and a location is proximity alert. Proximity alert application allows a user to configure alerts based on the proximity of a user or a location. The proximity alert application, upon receipt of new information, determines the proximity between the user and all the users and locations user expressed desired having alerted about. If the application determines any of the locations or users are in the proximity of the user, the user is alerted. Proximity alerts can be of two types, alert of proximity of a user to another user and alert of proximity of a user to a location.

Figure 14:
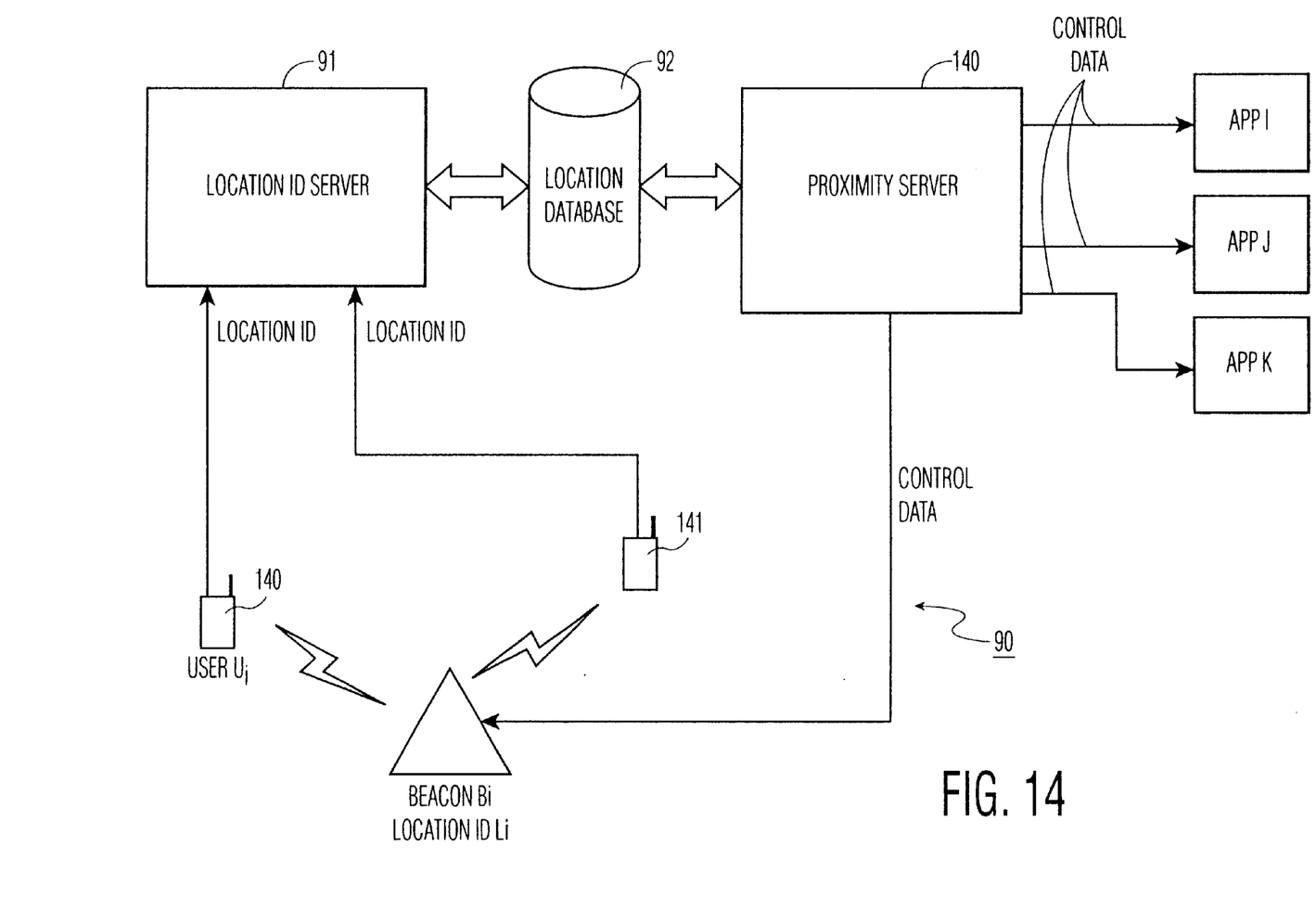
FIG. 14 illustrates modification of system behavior in a proximity based wireless system according to the invention.

FIG. 14 illustrates modification of system behavior in a proximity based wireless system according to the invention. In addition to the location identification server 91, the system 90 comprises a proximity server 140. The proximity server 140 may be included in the location identification server 91. Wireless devices 140 and 141 are in-range of beacon 142.

Proximity detection is used to modify the behavior of the system or parts of system based on the proximity of the users. Typically parts of the system are controlled. This application uses the location information collected by the location identification server 91 and processes it to determine the proximity of users to users and users to locations. Based on the information, this application modifies parts of the system it controls accordingly. In the example given, the proximity server 140 controls the wireless beacon 142 and selection of applications I, J, and K.

Figure 15A:
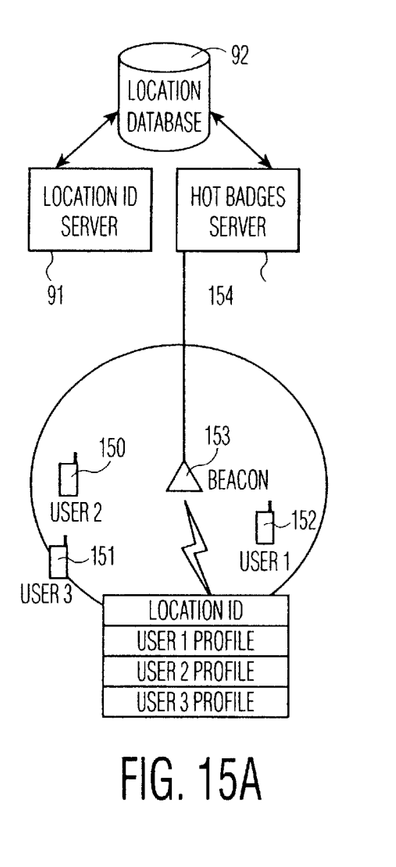
FIG. 15 shows a hot badge application in such a proximity based system.
Figure 15B:
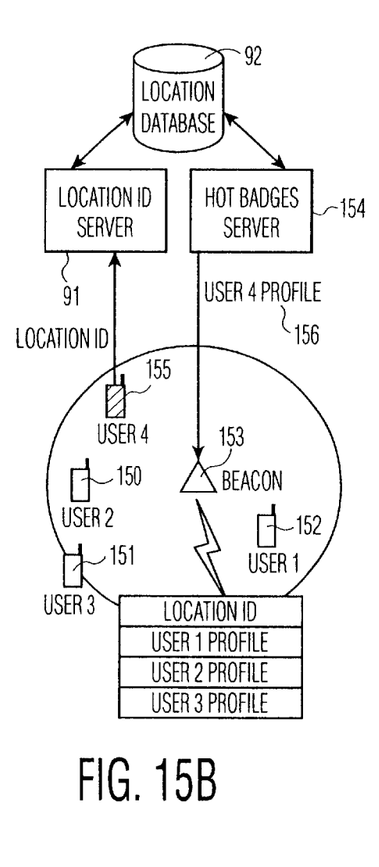
Figure 15C:
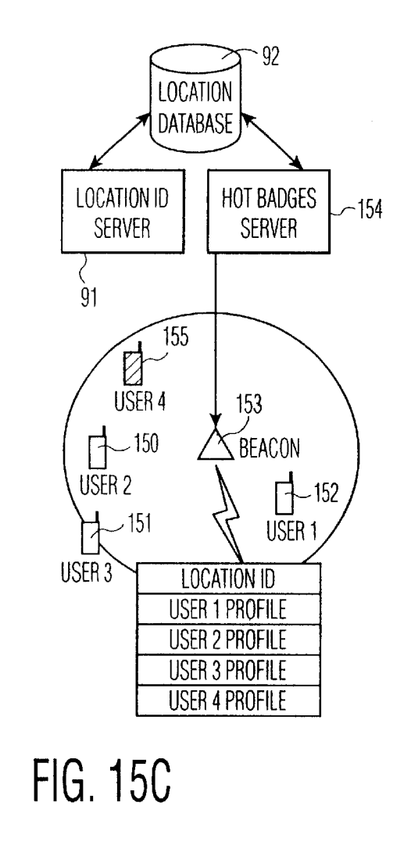

FIG. 15 shows a hot badge application in such a proximity based system. As shown, wireless devices 150–152 are in-range of beacon 153. Further shown are user profiles of users of the wireless devices 150–152, and a hot badge server 154. The hot badge server may be included in the location identification server 91.

Hot badges broadly is a match making application. Each user has a personal profile. A user sets up a profile of other user he/she would like to meet. When the user enters the range of "Hot Badge Capable" wireless beacon 153, the wireless beacon 153 informs the user of other users and their profiles that are in-range of the wireless beacon 153. The user's wireless device, based on user's interest, alerts user of a person being in-range.

In this scenario, when the user enters the range of a beacon, a user's wireless device receives the location identifier ID of the wireless beacon 153 and transmits it to the location identification server 91. The hot badge server 154 which receives this information from the location database 92, instructs the wireless beacon the user is close to, to modify its behavior to reflect the new user. A wireless beacon modifies the information it broadcasts to include the new user's profile in the information. When a user receives the information, the user's wireless device matches all the profiles against a required profile and alerts the user if necessary.

In FIG. 15A, wireless devices 150–152 are in-range of wireless beacon 153. In FIG. 15B a new wireless device 155 with user4 enters into range of the wireless beacon 153 resulting in providing user's user profile 156 to hot badge server 154. In FIG. 15A, the end situation is achieved that beacon 153 now broadcasts user profiles of users 1–4.

FIG. 16 shows filtering in a proximity alert system according to the invention.

A users' wireless device transmits location identification to the location identification server whenever it receives a new location identification from a wireless beacon. The location identification server processes all location identifications it receives and stores them in the location database for use by other applications. But, if a user passes wireless beacon ranges too fast or a set of beacon ranges too frequently, it would be more efficient to filter some of the location identifications that are passed to location identification server or that are stored in the location database.

Location data filtering can be done at the side of the client, a wireless device, and at the side of the server.

Server side location data filtering is a process that analyzes location data received from wireless device and optimizes the location data for other applications to use it efficiently. Filtering primarily involves removing data that is redundant and does not add any value to the data that is already existing in the database. Such data costs applications time without any use.

Example of Redundant Data that Can Be Filtered by Server Side Location Data Filtering The location identification server can determine the distance between any two given location identifications. If two successive location identifications received from a handheld are not so far apart that it makes a difference to the applications that are processing the data, the location identification server may choose to ignore the latter location identification.

Client side location data filtering is a process, possibly implemented by an application, that optimizes the number location identifications that are transmitted to the location identification server so as to optimize wireless device—location identification server communication. In several situations the wireless device is in a position to determining which data is redundant to the location identification server.

For instance, a user's wireless device may implement a simple filter that follows the rule "transmit only once a minute". The wireless device after having transmitted a location identification to the location identification server does not transmit a new location identification until after one minute. Such a method is efficient if the user is moving too fast through wireless beacon ranges. A wireless device can easily recognize that the user is moving fast and there is no value in transmitting all location identifications a user encounters since a user will not stay in range of a wireless beacon for long.

Figure 16A:
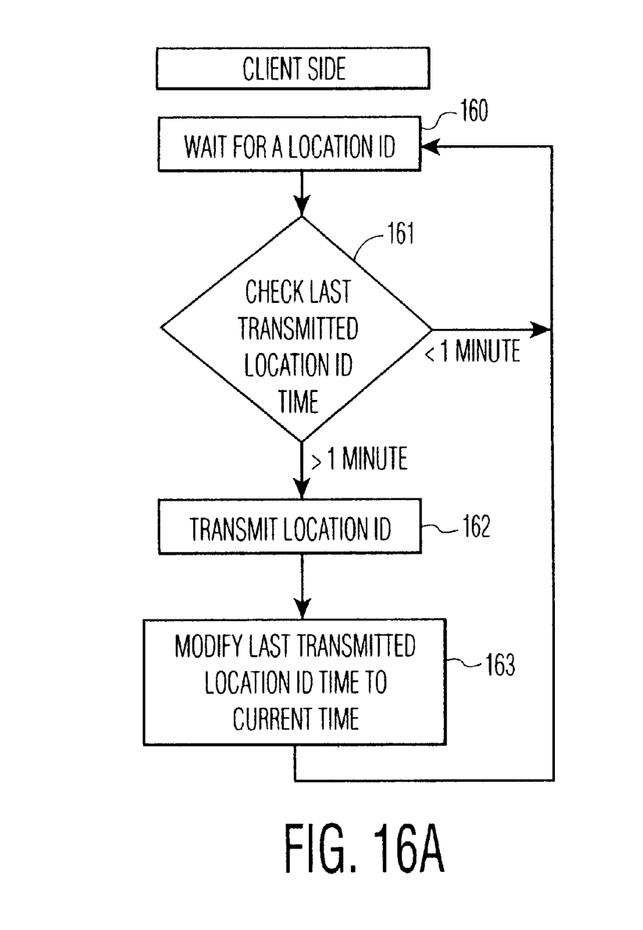
FIG. 16 shows filtering in a proximity alert system according to the invention.
Figure 16B:
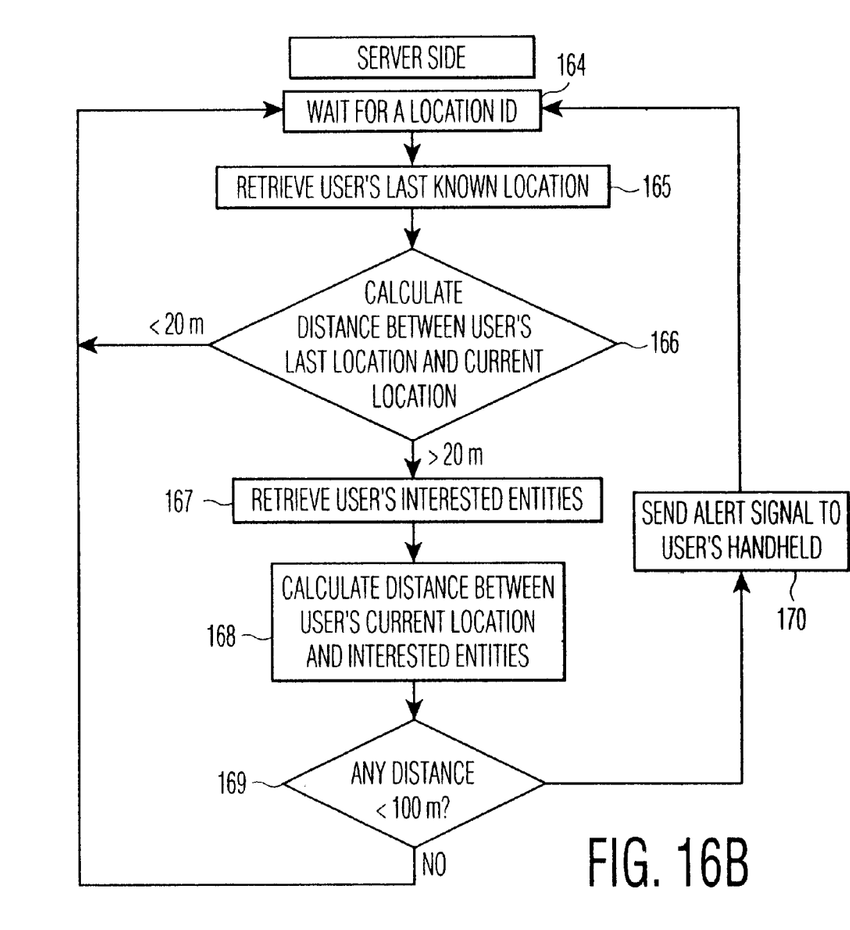

FIG. 16A shows client side filtering and FIG. 16B shows server side filtering.

Filtering at Client's Side

In block 160, a wireless device waits for a location identifier. When received, in block 161 it checks whether a predetermined period, for instance one minute, since a previous transmission of a location identifier to the location server has expired. If so, in block 162 it transmits the newly acquired location identifier. Otherwise it ignores the newly acquired one and it waits for still another one. Upon transmission of a location identifier, in block 163 the wireless device sets the predetermined period to one minute.

Filtering at Server's Side:

In block 164, the server waits for a location identifier. Upon reception, in block 165 it retrieves a user's last known location. In block 166, it then calculates a distance between a current and a previous location of the user and checks whether the distance is below a given threshold, e.g. 20 m. If so, no update occurs. If this is not the case, in block 167 the user's interested entries are retrieved and in block 168 it is calculated what is the distance between a user's current location and his interested entries. If the latter distance is too large, as tested in block 169, e.g. above 100 m, the server waits for another location identification. Otherwise, in block 170 an alert signal is sent to the user.

In view of the foregoing it will be evident to a person skilled in the art that various modifications may be made within the spirit and the scope of the invention as hereinafter defined by the appended claims and that the invention is thus not limited to the examples provided. The word "comprising" does not exclude the presence of other elements or steps than those listed in a claim.

What is claimed is:

1. In a wireless device, a method of selecting an application, said method comprising:

receiving application specific messages from a wireless station, said application specific messages being specific to services provided via a wireless station transmitting said application specific messages, and said application specific messages comprising an application specific identifier identifying a specific application and data corresponding to said specific application;

determining whether an application is present in said wireless device that corresponds to said received application specific identifier;

ignoring said corresponding received data if it is determined that said corresponding application is absent in said wireless device;

if it is determined that said corresponding application is present in said wireless device, determining whether said corresponding application is currently active in said wireless device; and     activating said corresponding application and passing correspondingly received data to said activated application if it is determined that said corresponding application is currently inactive and said received application specific identifier matches an application specific profile, said application specific profile defining criteria under which said corresponding applications is to be selectively activated.

2. The method as claimed in claim 1, further comprising receiving said application specific messages through packet data transmission, prior to transmission said application specific messages each being distributed over a plurality of packets, and re-assembling said received packets into said received application specific messages upon reception of said packets.

3. The method as claimed in claim 2, wherein said application specific messages are comprised in a data stream further comprising non-application-specific messages.

4. The method as claimed in claim 1, further comprising if it has been determined that said corresponding application is present in said wireless device and said corresponding application is active, passing said correspondingly received data to said corresponding application.

5. A wireless device comprising:

means for receiving application specific messages from a wireless station transmitting said application specific messages, said application specific messages being specific to services provided via said wireless station, and said application specific messages comprising an application specific identifier identifying a specific application and data corresponding to said specific application;

means for determining whether an application is present in said wireless device that corresponds to said received application specific identifier;

means for ignoring said correspondingly received data if it is determined that said corresponding application is absent in said wireless device;

means for determining whether said corresponding application is currently active if it is determined that said corresponding application is present in said wireless device; and means for activating said corresponding application and passing correspondingly received data to said activated application if it is determined that said corresponding application is inactive and said received application specific identifier matches an application specific profile, said application specific profile defining criteria under which said corresponding applications is to be selectively activated.

6. A wireless device as claimed in claim 5, wherein said application specific messages are received through packet data transmission and said application specific messages each are distributed over a plurality of packets, said wireless device further comprising re-assembling means for upon reception of said packets re-assembling said received packets into said received application specific messages.

7. A wireless device as claimed in claim 5, wherein said application specific messages are comprised in a data stream further comprising non-application-specific messages.

8. A wireless device as claimed in claim 5, wherein if it has been determined that said corresponding application is present in said wireless and said corresponding application is active, said wireless device being configured to pass said correspondingly received data to said corresponding application.

9. A wireless device as claimed in claim 5, wherein said wireless station is arranged to transmit said application specific messages as additional data to data transmitted in accordance with a Bluetooth specification, said additional data being transmitted in a transmit guard space otherwise unused under said Bluetooth specification.

10. A wireless device as claimed in claim 5, whereby said wireless station is configured to transmit over a predetermined coverage area within a system comprising further wireless stations.

* * * * *